United States Patent [19]

Ishimoto et al.

[11] Patent Number: 5,483,364

[45] Date of Patent: Jan. 9, 1996

[54] HOLOGRAPHIC STEROSCOPIC DISPLAY METHOD AND APPARATUS USING HIGH AND LOW SAMPLE POINT DENSITIES OF FEATURE AND NON-LECTURE PORTIONS OF A HOLOGRAPHIC STEROGRAM

[75] Inventors: Manabu Ishimoto; Masayuki Kato; Hirokazu Aritake; Noriko Sato, all of Kawasaki, Japan

[73] Assignee: Fujitsu Limited, Kawasaki, Japan

[21] Appl. No.: 124,074

[22] Filed: Sep. 21, 1993

[30] Foreign Application Priority Data

Sep. 30, 1992 [JP] Japan .................................. 4-260920

[51] Int. Cl.$^6$ .............. G03H 1/08; G03H 1/26; G02B 5/32
[52] U.S. Cl. ................. 359/9; 359/15; 359/22; 359/23
[58] Field of Search .................... 359/23, 22, 15, 359/9, 21, 24, 25, 26

[56] References Cited

U.S. PATENT DOCUMENTS

| | | | |
|---|---|---|---|
| 4,969,700 | 11/1990 | Haines | 359/22 |
| 5,119,214 | 6/1992 | Nishii et al. | 359/21 |
| 5,128,780 | 7/1992 | Smith | 359/24 |
| 5,138,471 | 8/1992 | McGrew | 359/22 |
| 5,187,597 | 2/1993 | Kato et al. | 359/22 |
| 5,347,375 | 9/1994 | Saito et al. | 359/9 |

FOREIGN PATENT DOCUMENTS

| | | | |
|---|---|---|---|
| 55-161267 | 6/1979 | Japan | 359/9 |
| 93/13463 | 1/1992 | WIPO | 359/9 |

OTHER PUBLICATIONS

T. Yatagai, "Stereoscopic Approach to a 3–D Display Using Computer–Generated Holograms", Applied Optics, vol. 15, No. 11, Nov. 1976, pp. 2722–2729.

Primary Examiner—Frank Gonzalez
Assistant Examiner—Jason D. Eisenberg
Attorney, Agent, or Firm—Staas & Halsey

[57] ABSTRACT

A stereoscopic display method whereby a hologram phase distribution is calculated and the calculated phase distribution is expressed and the expressed phase distribution is converted into a wave front of the light, thereby displaying a solid image. Further, a feature portion in a display target specified by 3-dimensional information is detected. Sampling points are set at a high density into the detected feature portion. Sampling points are set at a low density with respect to a non-feature portion as a portion other than the feature portion. In the phase calculation, a hologram phase distribution is calculated with respect to the set sampling points.

22 Claims, 13 Drawing Sheets

HOLOGRAPHIC STEROSCOPIC DISPLAY METHOD AND APPARATUS USING HIGH AND LOW SAMPLE POINT DENSITIES OF FEATURE AND NON-LECTURE PORTIONS OF A HOLOGRAPHIC STEROGRAM

BACKGROUND OF THE INVENTION

The present invention relates to stereoscopic display method and apparatus for calculating a phase distribution from 3-dimensional information of an object and performing a holographic stereoscopic display and, more particularly, to stereoscopic display method and apparatus for expressing an object as a display target by sampling points, thereby calculating a phase distribution.

In case of obtaining phase information to display a hologram from the 3-dimensional information of an object by a computer, a very large amount of information must be handled, so that it is hitherto demanded to reduce a calculation amount.

Conventionally, in computer processes of phase information to display a hologram from the 3-dimensional information of an object, as shown in FIG. 1, an object or space, which is specified by 3-dimensional information and is displayed, is divided in a lattice shape at regular intervals and sampling points shown by dots are set at regular intervals. A phase distribution is calculated for every microarea of the hologram plane which expresses the phase distribution while using a set of sampling points as a display target. In this case, by setting the interval between sampling points to a limit of the resolution of the human eyes, a solid image can be displayed without deteriorating picture quality.

When the interval between sampling points of the object which are used in the phase calculation is uniformly set to the resolution limit of the human eyes, however, the number of sampling points is extremely large. Processes for calculating the phase distribution for every sampling point and adding the calculated phase distributions with respect to all of the sampling points must be repeated for every microarea of all of the hologram planes. There is consequently a problem such that the amount of calculations to obtain the phase information is extremely large and it takes a long time to calculate the phase information. To reduce the amount of calculations for the phase information, a method of uniformly reducing the number of sampling points is also considered. However, this causes a problem in that the picture quality deteriorates. The resolution of the human eyes, on the other hand, varies depending on the conditions such as observation distance, nature of the image, and the like. The use of the method of uniformly setting the interval between sampling points on the basis of the highest resolution merely results in an increase in the amount of calculation, for the phase information than it is needed, so that such a method is not always preferable.

SUMMARY OF THE INVENTION

According to the present invention, there are provided stereoscopic display method and apparatus for reducing the number of sampling points to calculate phase information in a holographic stereoscopic display. First, the invention has been made on the assumption that it is intended to provide a stereoscopic display method comprising: a phase calculating step of calculating a hologram phase distribution; a phase distribution expressing step of expressing the phase distribution calculated by the phase calculating step; and a wave front converting step of converting the phase distribution expressed by the phase distribution expressing step into a wave front of the light, thereby displaying a solid image. In addition to the above processing steps, the invention further has: a feature portion detecting step of detecting a feature portion in a display target specified by 3-dimensional information; and a sampling point setting step of setting sampling points at a high density into the feature portion detected by the feature portion detecting step and setting sampling points at a low density with respect to a non-feature portion as a portion other than the feature portion. In the phase calculating step, a hologram phase distribution is calculated with respect to the sampling points set by the sampling point setting step.

The feature portion used in the specification is a portion in which a change in gradation of an image at the edge of an object or in the plane thereof. With respect to the feature portion, the sampling points are set at a high density. With respect to the non-feature portion other than the feature portion, the sampling points are set at a low density. The phase calculating step comprises: a step of setting a region on a hologram to calculate the phase distribution of the sampling points of the feature portion; a step of setting a region on the hologram to calculate the phase distribution of the sampling points of the non-feature portion so as to be different from the region in case of the feature portion; and a step of calculating the phase distribution every region. In this case, it is also possible to construct in a manner such that a region in which small regions are discretely arranged on the hologram is set as a region on the hologram to calculate the phase distribution of the sampling points of the non-feature portion, thereby making the sampling points in the non-feature region blur when a hologram is displayed, so that a solid image can be displayed as a continuous plane although the sampling points are coarse.

According to such stereoscopic display method and apparatus of the invention as mentioned above, a density of the sampling points in the feature portion is set to a high value and a density of the sampling points in the non-feature portion to a low value so as to match with the effective resolution of the human eyes and the total number of sampling points is reduced as a whole, so that an amount of calculations for the phase distribution can be reduced. With respect to the non-feature portion in which the density of the sampling points is coarse, phase distributions of the hologram planes are discretely calculated so as to cause a blur in the reconstructed image due to a diffraction effect, thereby enabling a continuous plane to be displayed even in case of the coarse sampling points. Specifically speaking, a portion having a feature such as edge portion of an object or portion of a high contrast is sampled at a high resolution, and a smooth portion of a small contrast difference is sampled at a low resolution. As a sampling method, a display space is divided at regular angles around the visual point of the observer, thereby sampling so as to set a coarse resolution as the object is far from the observer. Further, a portion which is seen as a dark portion for the human eyes is not sampled. By setting those sampling points, the calculation amount of the phase information can be reduced without substantially deteriorating the picture quality.

The above and other objects, features, and advantages of the present invention will become more apparent from the following detailed description with reference to the drawings.

DETAILED DESCRIPTION OF THE PREFERRED EMBODIMENT

Figure 1:
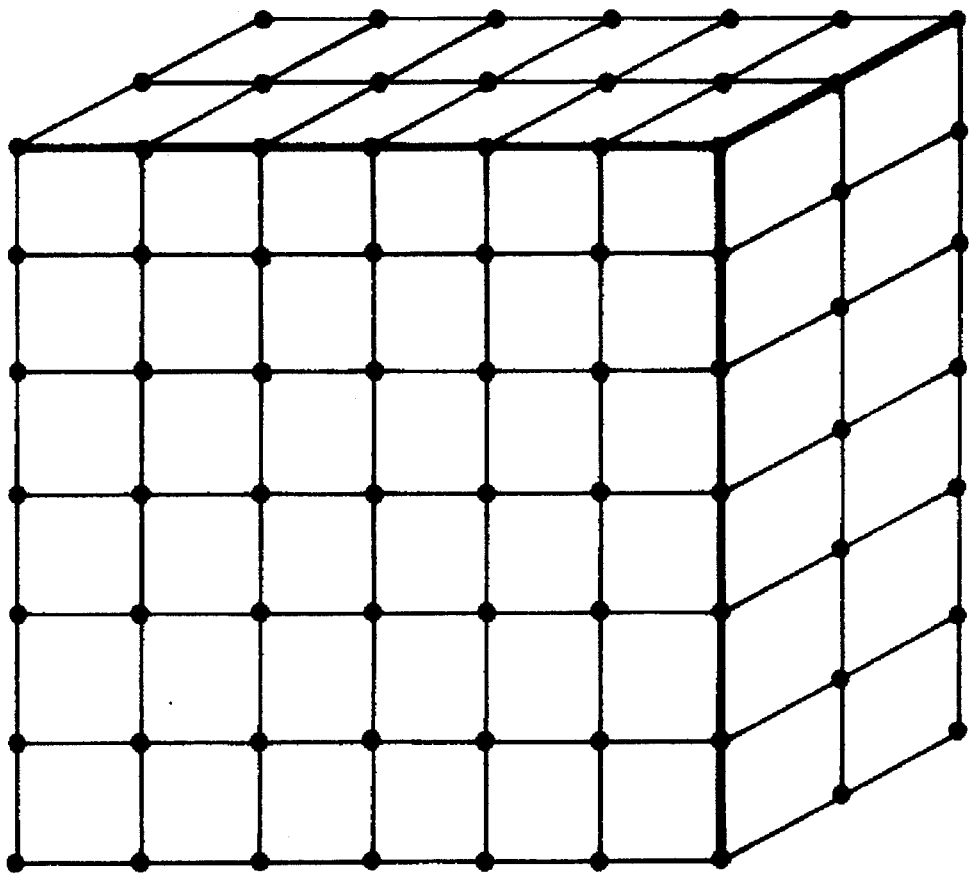
FIG. 1 is an explanatory diagram showing the conventional setting of uniform sampling points.
Figure 2:
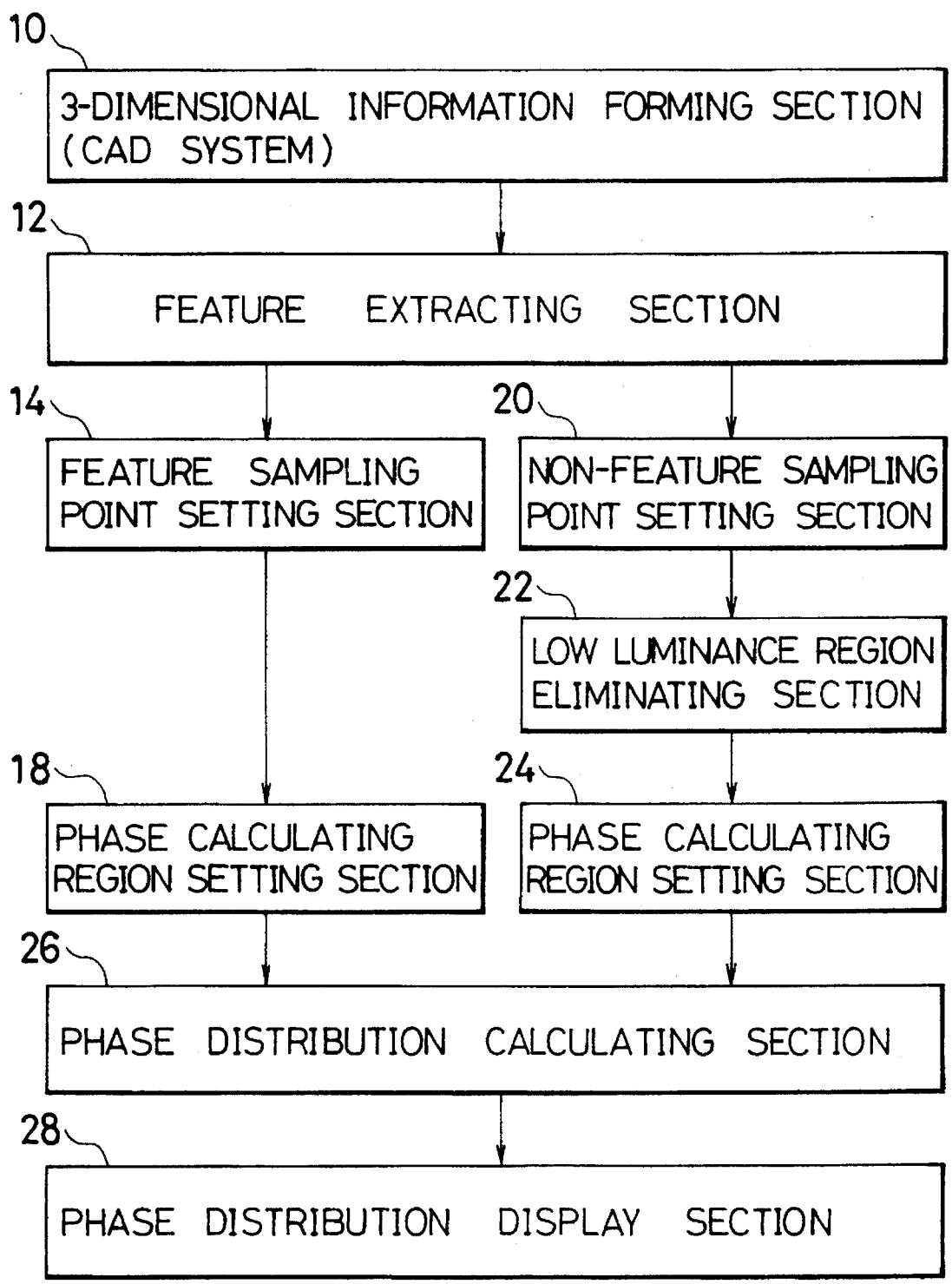
FIG. 2 is a block constructional diagram showing an embodiment of the invention.

FIG. 2 shows an embodiment of a stereoscopic display apparatus of the invention. The stereoscopic display apparatus of the invention has a 3-dimensional information forming section 10 using a CAD system or the like. Information of an object to be stereoscopically displayed is inputted from the 3-dimensional information forming section 10. The information of the display target from the 3-dimensional information forming section 10 is given to a feature extracting section 12. The information of the display target, which need to be sampled at a relatively high resolution, are extracted as a feature portion and the other points are extracted as a non-feature portion. The feature portion of the display target extracted by the feature extracting section 12 is given to a feature sampling point setting section 14 and sampling points are set at a high resolution. After completion of the setting of the sampling points to the feature portion, a phase calculating region at a hologram plane is set by a phase calculating region setting section 18. On the other hand, the non-feature portion extracted by the feature extracting section 12 is given to a non-feature sampling point setting section 20. Sampling points are set at a low resolution. In a low luminance region eliminating section 22, further, a portion which is dark when it is seen by the human eyes is eliminated from the region in which sampling points are set. The sampling points set in the non-feature portion are finally given to a phase calculating region, setting section 24. A phase calculating region at the hologram plane by the sampling points set in the non-feature portion, is set.

After the phase calculating regions of the feature portion and non-feature portion were respectively set by the phase calculating region setting sections 18 and 24, a phase distribution is calculated by a phase distribution calculating section 26. Namely, phase distributions are calculated every predetermined microregion of the hologram plane with respect to all of the sampling points as a target. A phase distribution is subsequently obtained by adding the results of the calculations of the phase distributions of all of the sampling points. Such a process is executed with respect to all of the microregions of the hologram plane. After the phase distributions at the hologram plane were calculated by the phase distribution calculating section 26, in a phase distribution display section 28, the calculated phase distributions are expressed by a display device such as a liquid crystal display or the like provided at the position of the hologram plane. In this state, by irradiating a reproduction light to the display device and by converting the reproduction light into the wave front by the expressed phase distribution, a solid image is displayed.

Figure 3:
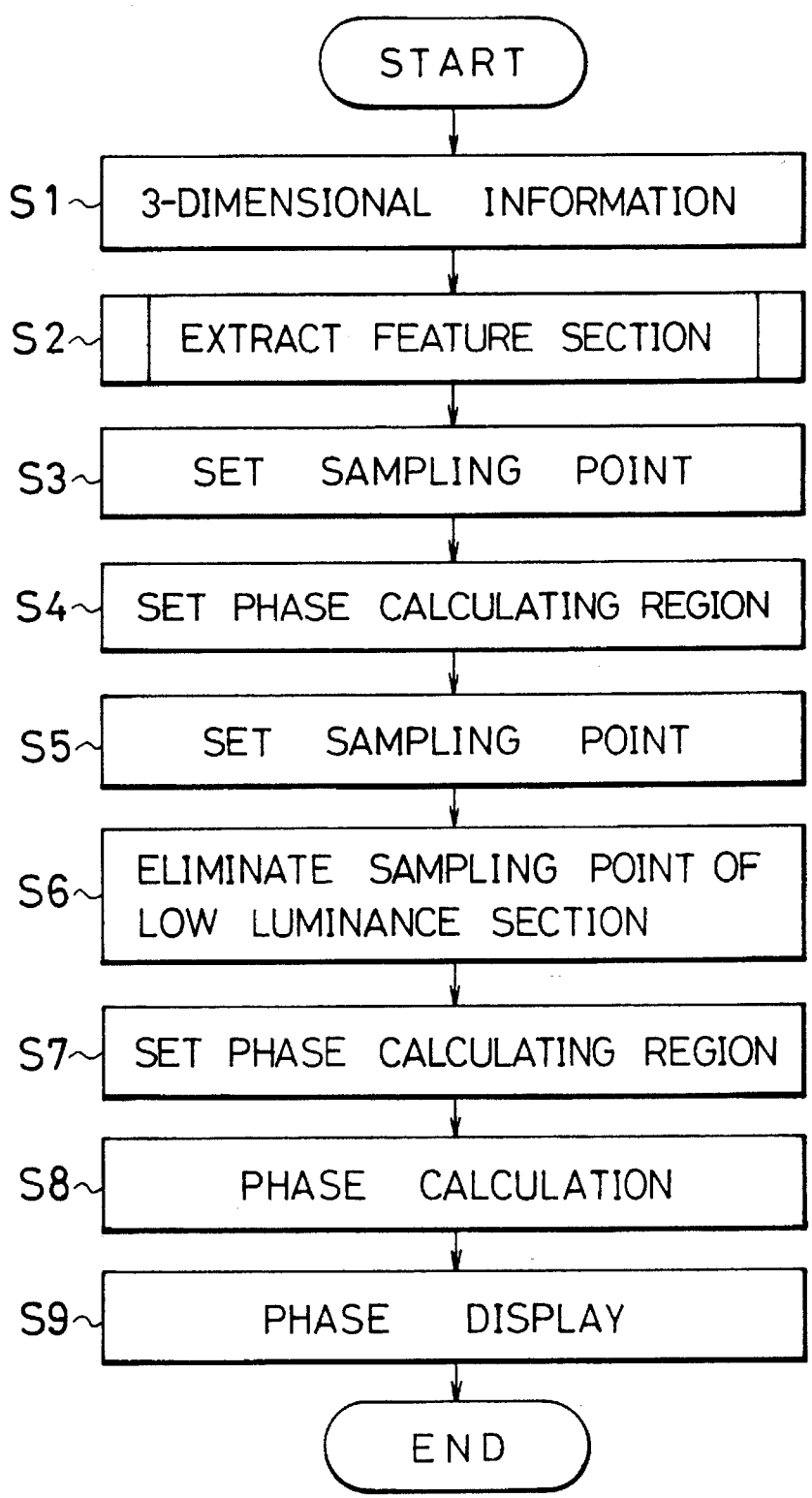
FIG. 3 is a flowchart showing a procedure of a stereoscopic display method of the invention.

A flowchart of FIG. 3 shows a processing routine as a stereoscopic display method of the invention and corresponds to a processing procedure of the apparatus construction shown in FIG. 2. First, in step S1, 3-dimensional information as a display target is inputted. In step S2, a feature portion is extracted. In step S3, sampling points are set with respect to the extracted feature portion. The details of the setting of the sampling points in the feature portion will be clearly explained hereinlater. In step S4, phase calculating regions at the hologram plane based on the sampling points set in the feature portion are set. In step S5, sampling points are set with respect to the non-feature portion. The setting of the sampling points of the non-feature portion will be also clearly explained hereinafter. After the sampling points of the non-feature portion were set, the sampling points of a low luminance portion are eliminated in step S6. In step S7, phase calculating regions at the hologram plane based on the sampling points set in the non-feature portion are set. In the setting of the phase calculating regions corresponding to the sampling points of the non-feature portion, for example, they are discretely set on the hologram plane in a checkerwise manner. By the setting of such discrete phase calculating regions, the sampling points of the non-feature portion in the case where the phase distribution is expressed and is converted into the wave front are made blur, thereby enabling a continuity of the plane to be displayed even when the interval between the sampling points is widened. In step S8, on the basis of the setting of the phase calculating regions of the feature portion in step S4 and the setting of the phase calculating regions of the non-feature portion in step S7, the phase calculation is executed with respect to all of the microregions while setting each of the microregions on the hologram plane based on each sampling point into one unit. In step S9, the result of the calculation of the phase distribution calculated in step S8 is read out from, for example, a memory or the like and displayed on a display apparatus such as a liquid crystal device or the like. A reference light is irradiated to the expressed phase distribution, thereby enabling a solid image to be displayed.

Figure 4:
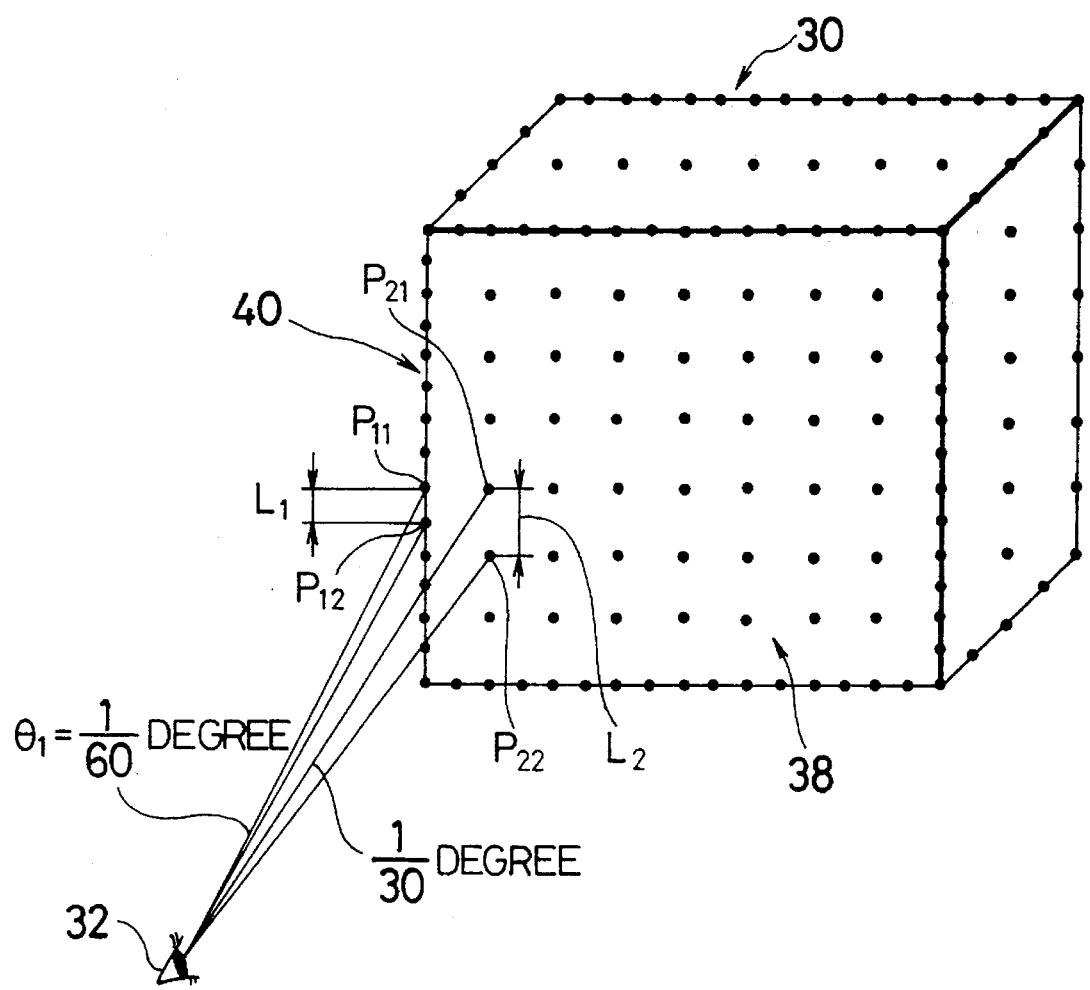
FIG. 4 is an explanatory diagram of a method of separately setting sampling points with respect to a feature portion and a non-feature portion according to the invention.

FIG. 4 shows the principle for separately setting sampling points at two different kinds of regular intervals with respect to the feature portion and the non-feature portion for a 3-dimensional display target in the invention. A solid body is now used as a display target 30. The display target 30 is divided into a feature portion and a non-feature portion. As a feature portion of the target object 30, there is an edge portion or a portion of a high contrast. As a non-feature portion, there is a portion of a small contrast. Namely, when an attention is paid to the angular resolution of the human eyes, for example, the human eyes have an angular resolution of about 1° in case of an eyesight of 1.0. In the ordinary life, an angle resolution of about 2° is sufficient. When the human being sees a moving object, it is said that the human gaze traces a pattern such that an outline or density of an object suddenly changes or the like. Namely, when a moving object is reproduced, it is necessary to reproduce the moving object at a high resolution with respect to a portion of a reproduction image, which the human gaze traces. This means, however, that a high resolution is not always necessary with respect to the other portions.

When a 3-dimensional image is reproduced, a portion which needs a high resolution is defined as a feature portion and the other portion is defined as a non-feature portion from a viewpoint of the angular resolution of the human eyes. The edge portion or the portion of a high contrast of the display target 30 shown in FIG. 4 are included in the feature portion. The portion of a small contrast is included in the non-feature portion. Therefore, with respect to the edge as a feature portion of the display target 30, sampling points are set at fine intervals. With respect to the other non-feature portion, sampling points are set at coarse intervals.

Figure 5:
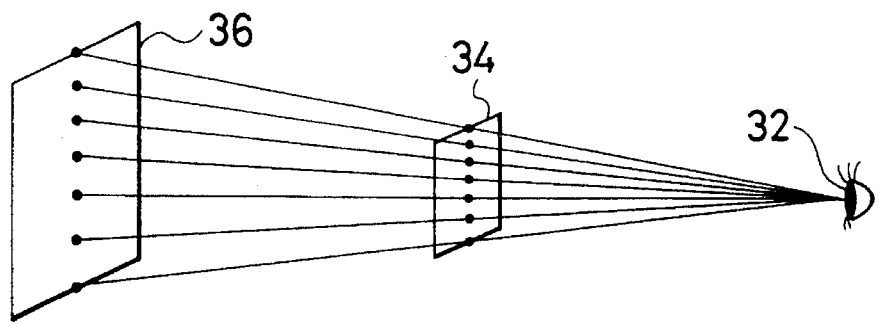
FIG. 5 is an explanatory diagram of a method of setting sampling points by an angle dividing method of the invention.

As a rule in the setting of the sampling points in the invention, an angle dividing method shown in FIG. 5 is used. According to the angle dividing method, sampling points are set on the lines divided by a predetermined angle around a visual point 32 of the observer. Therefore, the sampling points are arranged at fine intervals at a plane 34 near the eyes 32 of the observer.

The interval between the sampling points at a plane 36 that is far from the observer increases as the positions of the sampling points are far from the plane 36. Namely, the near plane 34 is sampled at a high resolution. The remote plane 36 is sampled at a low resolution. It is now assumed that as shown in FIG. 4 a distance from the visual point 32 of the observer to a surface 38 of the display target 30 is equal to R, for example, an interval $L_1$ between sampling points $P_{11}$ and $P_{12}$ in an edge 40 as a feature portion is decided as follows.

$$L_1 = (1/2) \times R\tan\theta_1 \qquad (1)$$
$$= (1/2) \times R\tan\{(1/60)°\}$$

On the other hand, an interval $L_2$ between sampling points $P_{21}$ and $P_{22}$ on the plane 38 as a non-feature portion which are adjacent to the sampling points $P_{11}$ and $P_{12}$ of the edge 40 is decided as follows.

$$L_2 = (1/2) \times R\tan\theta_2 \qquad (2)$$
$$= (1/2) \times R\tan\{(1/30)°\}$$

As will be obviously understood from the equations (1) and (2), according to the invention, with respect to the feature portion, the sampling points are set at the interval which are determined by the equation (1). With respect to the non-feature portion, the sampling points are set at the interval which is half of the above interval as shown in the equation (2). By setting the sampling points such that the feature portion is set to the high resolution and the non-feature portion is set to a low resolution as mentioned above, the number of sampling points can be reduced as a whole and an amount of calculations of the phase distributions which are executed with respect to the hologram plane on the basis of the sampling points can be reduced.

Figure 6:
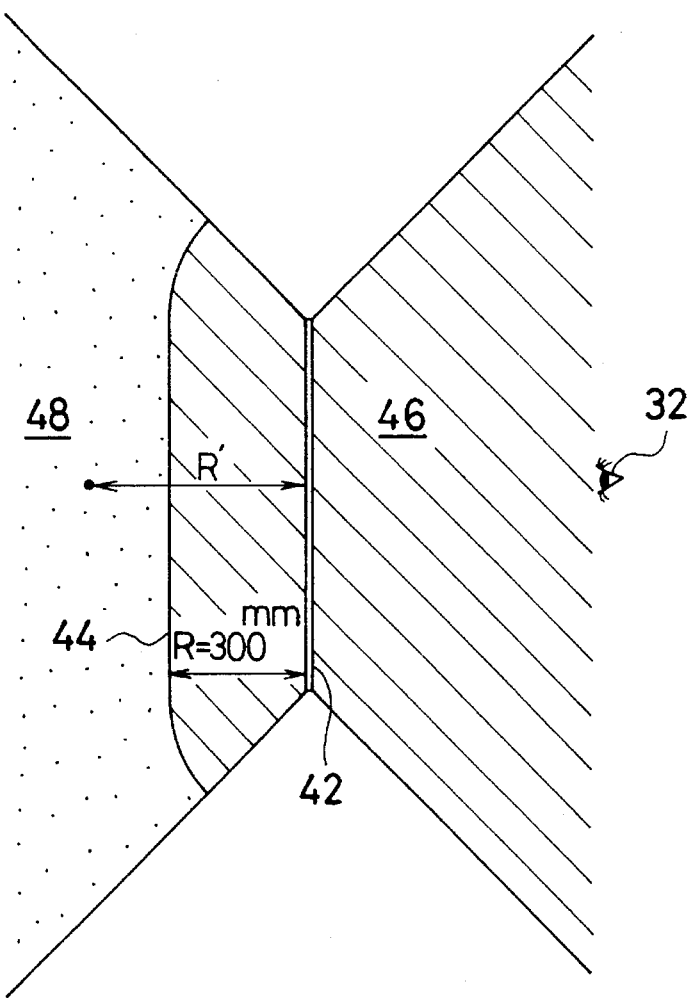
FIG. 6 is an explanatory diagram of a practical method of setting sampling points of the invention.

FIG. 6 shows a method of setting sampling points for a more specific display target according to the invention. A hologram display surface 42 is set in a proper display space. The hologram display surface 42 can be realized by expressing the phase distribution calculated by using, for example, a liquid crystal device or the like. As will be obviously understood from the equations (1) and (2), the interval between the sampling points is proportional to the distance R from the visual point of the observer 32 to the display object. Namely, as the observer 32 is at a distance that is close to the display object, fine sampling points must be set. However, when the observer is excessively close to the display object, it is hard to see the solid image. Therefore, the observer generally observes the display object from a remote distance of about 300 mm. Such a distance is called a least distance of distinguished vision at which the display object can be clearly seen.

Reference numerals 46 and 48 in FIG. 6 denote regions in which a solid image can be stereoscopically displayed by the hologram display surface 42. The distance R, however, from the observer 32 to the display object is variable and cannot be unconditionally decided. When the observer 32 observes the display object, accordingly, the observation region is divided into the region 46 in which the least distance of distinguished vision can be assured and the region 48 in which the display object is seen from a position where the observer is away from the display object by at least the least distance of distinguished vision or more. Since the observer 32 cannot put the visual point to a position which exceeds the hologram display surface 42, the region 48 is a region that is away from the object by the least distance of distinguished vision or more in the case where the eyes come into contact with the hologram display surface 42 and the object is seen in this state. In the case where the region is divided into the regions 46 and 48 as mentioned above, with respect to the region 46, for instance, the distance R is set to a fixed value of (R=300 mm). With respect to the feature portion and the non-feature portion, the intervals $L_1$ and $L_2$ between the sampling points are set in accordance with the following equations.

$$L_1 = (1/2) \times 300 \times \tan\{(1/60)°\} = 0.044 \; [mm]$$

$$L_2 = (1/2) \times 300 \times \tan\{(1/30)°\} = 0.087 \; [mm]$$

where, R=300 [mm] (constant)

With respect to the dotted region 48 which cannot be distinguished by the observer, when it is now assumed that the distance from the hologram display surface is set to R', the intervals $L_1$ and $L_2$ between the sampling points are set in accordance with the following equations.

$$L_1 = (1/2)R' \times \tan\{(1/60)°\} = 1.5 \times 10^{-4} R' \text{ [mm]}$$

$$L_2 = (1/2)R' \times \tan\{(1/30)°\} = 2.9 \times 10^{-4} R' \text{ [mm]}$$

where, R' > 300 [mm]

Namely, with respect to the region 48, the interval between the sampling points is set at a resolution that is inversely proportional to the distance R' from the hologram display surface 42. An extracting process of a feature portion according to the invention in a display object for setting sampling points by different resolutions will now be described in detail.

Figure 7:
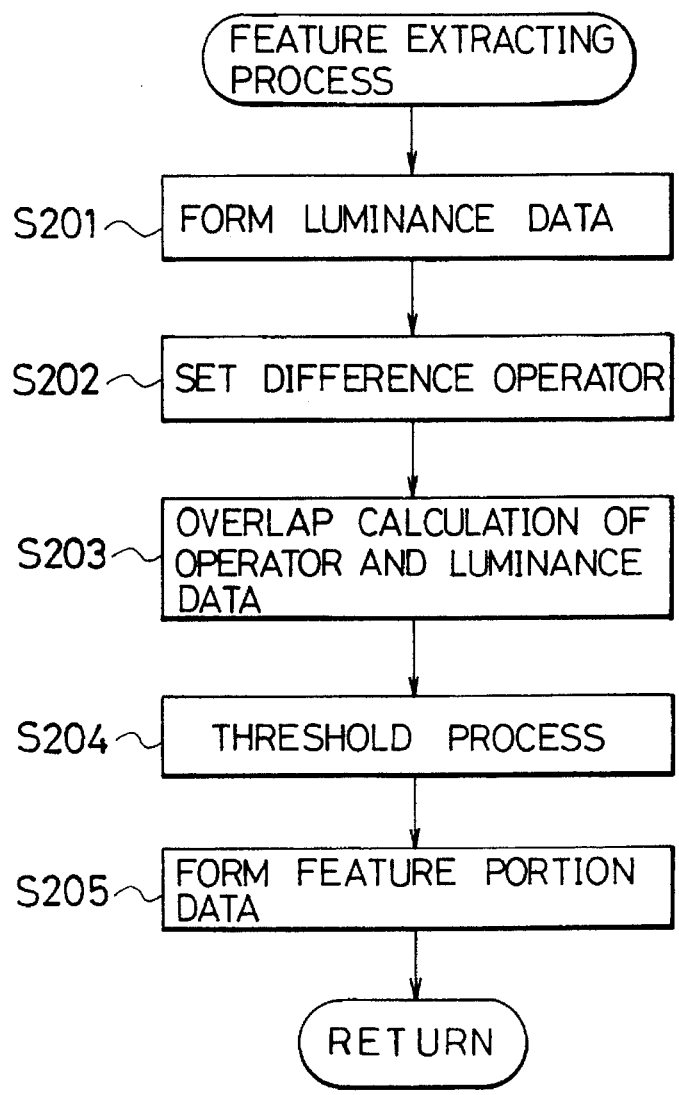
FIG. 7 is a flowchart showing the details of a feature extracting process in FIG. 2.

A flowchart of FIG. 7 shows the details of the feature portion extracting process shown in step S2 in FIG. 3. The 3-dimensional data inputted as a display target is used as a target and luminance data is first formed every pixel in step S201. The luminance data is constructed by luminance information and 3-dimensional coordinate information. In step S202, a difference operator which is known as a reference mask for detection of a difference is set. In step S203, an overlap calculation of the operator and the luminance data, namely, the product sum calculation is executed in a state in which the difference operators have been defined while setting each of the 3-dimensional pixel data as a target pixel. In step S204, a comparing process to discriminate whether the value obtained by the overlap calculation is equal to or larger than a predetermined threshold value or not. In step S205, the portion having the overlap position exceeding the threshold value is produced as feature portion data.

Figure 8A:
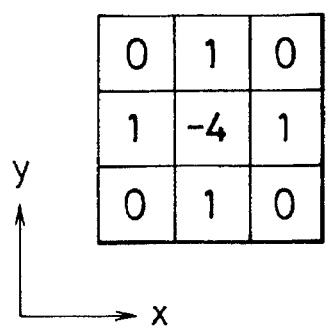
FIGS. 8A and 8B are explanatory diagrams of Laplacian operators which are used in the extraction of a feature of a 2-dimensional image.
Figure 8B:
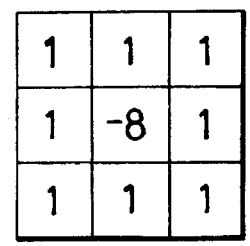

FIGS. 8A and 8B show operators as reference masks which are used in the quadratic differential operation (Laplacian operation) as an example of the edge extracting process of a 2-dimensional image. The Laplacian operator in FIGS. 8A and 8B is constructed by (3×3) mask patterns and the quadratic differential operations are executed in two directions of X and Y axes. Namely, "−2" is set into the central reference image setting position per one direction, so that "−4" is set for two directions. FIG. 8B shows the Laplacian operator which is used in the quadratic differential operations in eight directions in which the directions of 45° are further added. Since "−2" is set per one direction, "−8" is set into the setting portion of the central target pixel.

Figure 9:
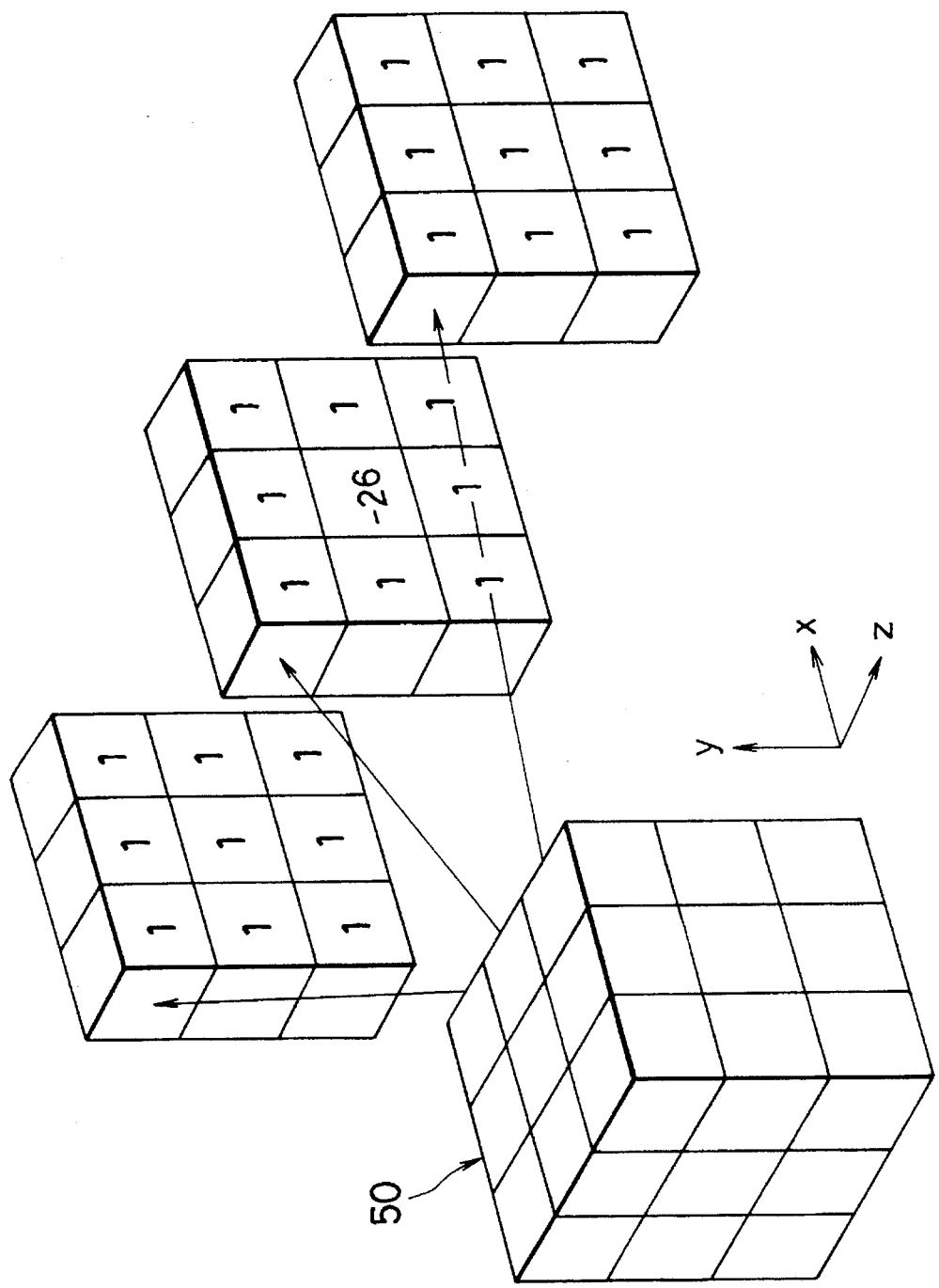
FIG. 9 is an explanatory diagram of Laplacian operators which are used in the feature extraction of a 3-dimensional pixel image.
Figure 10A:
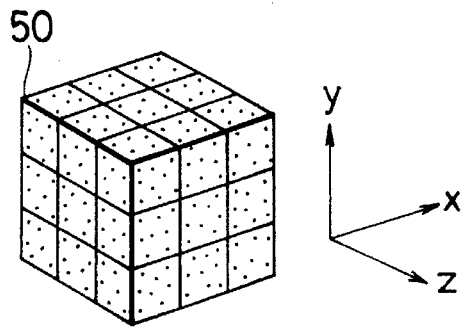
FIGS. 10A and 10B are explanatory diagrams of the feature extraction by 3-dimensional Laplacian operators.
Figure 10B:
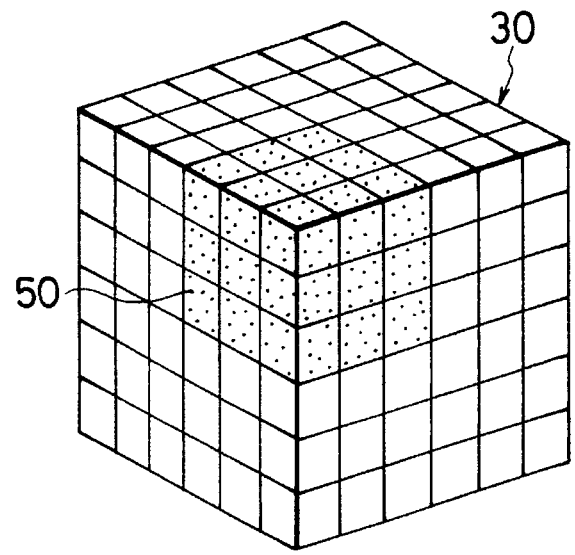

According to the invention, since a feature extraction is performed for the 3-dimensional luminance data as a target, for example, a 3-dimensional Laplacian operator 50 as shown in FIG. 9 is prepared on the basis of the Laplacian operators in the 2-dimensional image as shown in FIGS. 8A and 8B. That is, in case of a solid image, since the luminance data is ordinarily expressed in a form of pixel, "−26" is set into the central pixel to be set into the target pixel of the target 3-dimensional data constructed by (3×3×3=27) pixels as shown in FIG. 10A. "1" is set into the other pixels. The value of −26 of the central pixel is a value to execute the quadratic differential operations with respect to 13 directions comprising the directions of the 3-dimensional coordinates and the directions of 45°.

Figure 11:
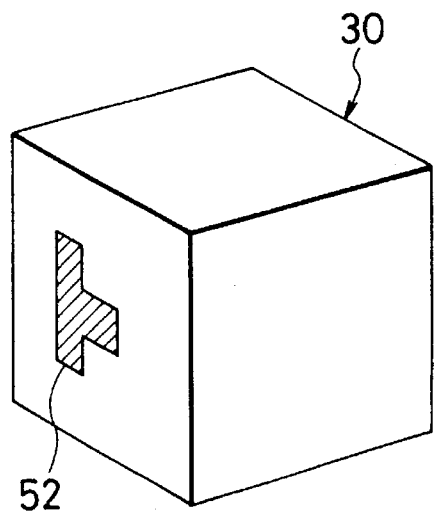
FIG. 11 is an explanatory diagram of a display target before extracting a feature.
Figure 12:
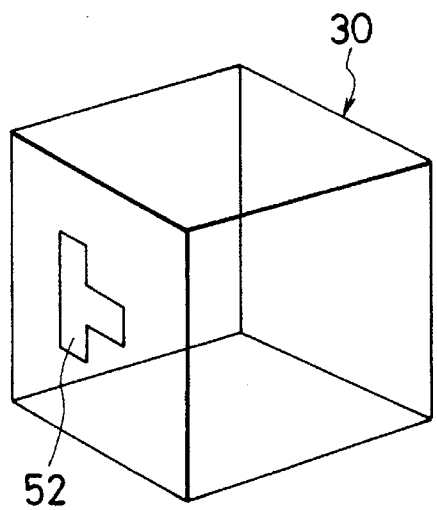
FIG. 12 is an explanatory diagram of a display target whose feature was extracted.

FIG. 11 shows the display target 30 which is used to extract a feature. A light/dark pattern 52 of a larger luminance change than that of the peripheral portion, for example, is displayed on one of the surfaces of the display target 30. When the feature extraction is executed by using the 3-dimensional Laplacian operator 50 with regard to the 3-dimensional luminance data of the display target shown in FIG. 11, the edges of the display object 30 and the region of the light/dark pattern 52 can be extracted as a feature portion as shown in FIG. 12.

Figure 13:
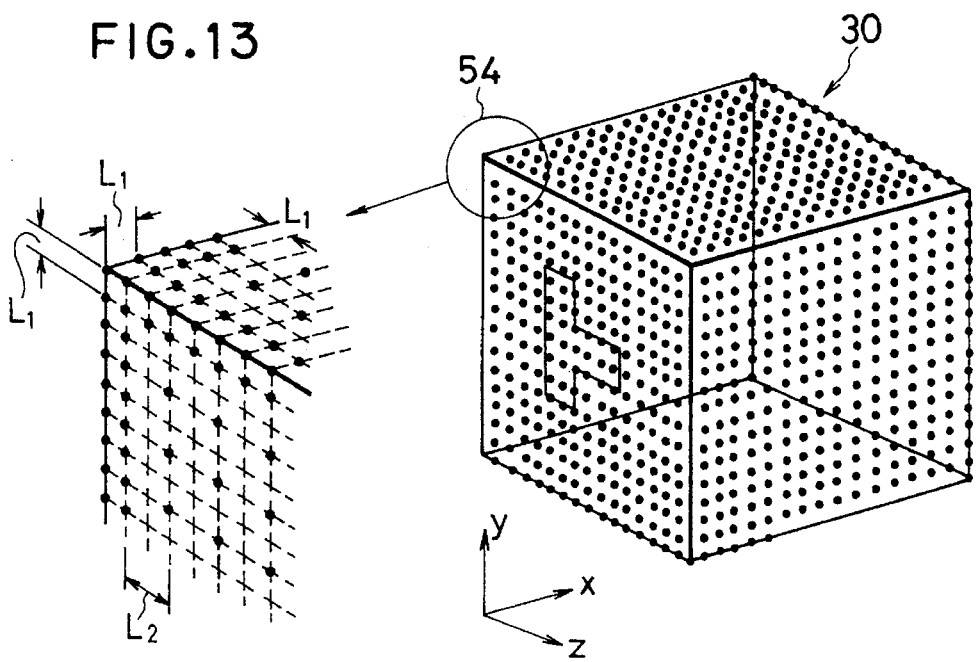
FIG. 13 is an explanatory diagram showing a specific example of the setting of sampling points according to the invention based on the feature extraction.

FIG. 13 shows an example of the setting of sampling points in the feature portion, and non-feature portion, which were detected by the feature extracting process by using the 3-dimensional Laplacian operator. Each dot on the display target 30 indicates the sampling point. As shown in the diagram on the left side of a left upper corner 54, in the edge portion detected as a feature portion, sampling points are set at the fine interval $L_1$, and in the flat plane portion excluding the edge portion, sampling points are coarsely set at the interval $L_2$ which is twice as large as the interval $L_1$. In the edge detection by the Laplacian operator, a slight width occurs in the edge portion, so that the sampling points are finely set in the edge portion and a portion near it. In case of FIG. 12, sampling points are set at the fine interval $L_1$ with respect to the edge and one line adjacent to the edge.

As mentioned above, with respect to the feature portion of the display target, points are arranged at the resolution limit of the human eyes in the reproducing mode, so that such sampling points are seen as a contour in case of the edge and sampling points are seen as points at which a boundary line is continuous in case of the light and dark portion. With respect to the points which are displayed as a non-feature portion, however, since its resolution is equal to or less than the resolution limit of the human eyes, there is a possibility such that those points are seen as discrete points in the reproduction of an image. According to the invention, however, with respect to the reproduction points of the non-feature portion, they are seen on the continuous plane by using a blur of a hologram image.

Figure 14:
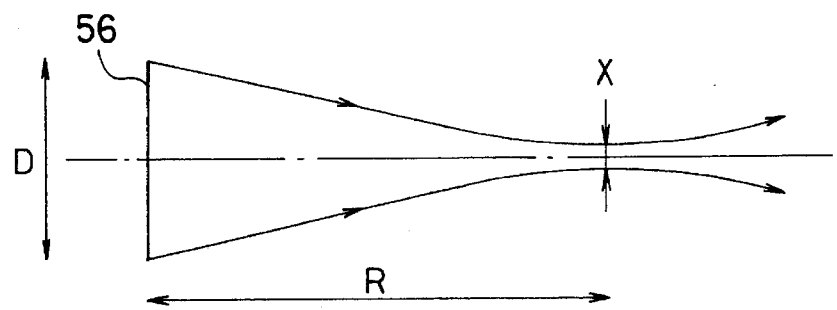
FIG. 14 is an explanatory diagram of a blur of an image due to a diffraction of a hologram.

As shown in FIG. 14, in case of trying to reproduce the points by a hologram 56 having an opening width D, a blur of the image appears due to a diffraction limit. An extent x of the blur is expressed by $$x = 2\lambda R/D \quad (3)$$

Figure 15:
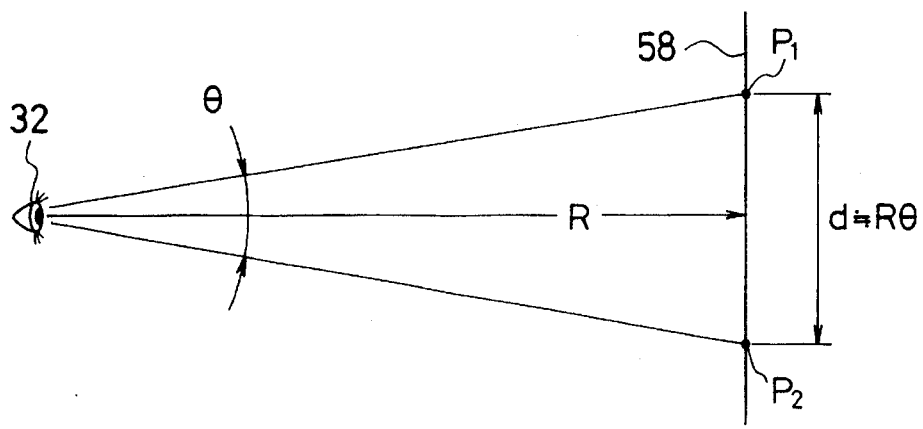
FIG. 15 is an explanatory diagram showing an angle and a positional relation in FIG. 14.

Namely, the blur extent x is determined by the opening D of the hologram 56, the distance R to the reproduction image, and the wavelength λ of the reproduction light. As shown in FIG. 15, it is now assumed that it is intended to reconstruct an image by a plane 58 locating at the position of the distance R from the visual point 32 and the points $P_1$ and $P_2$ of a pitch interval d. The interval d between the points $P_1$ and $P_2$ is expressed as follows by using an angle θ from the visual point 32.

$$d = 2R\tan(\theta/2) \div R\theta \quad (4)$$

Figure 16A:
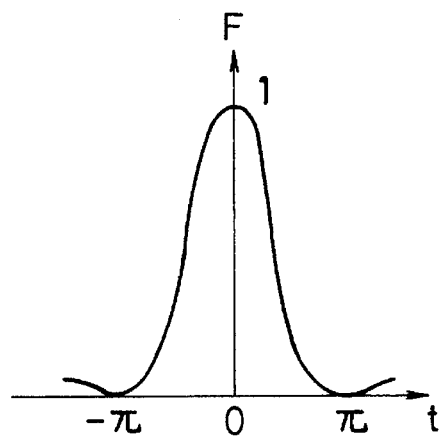
FIGS. 16A, 16B and 16C are explanatory diagrams showing diffraction intensity distributions due to a plurality of dot images.
Figure 16B:
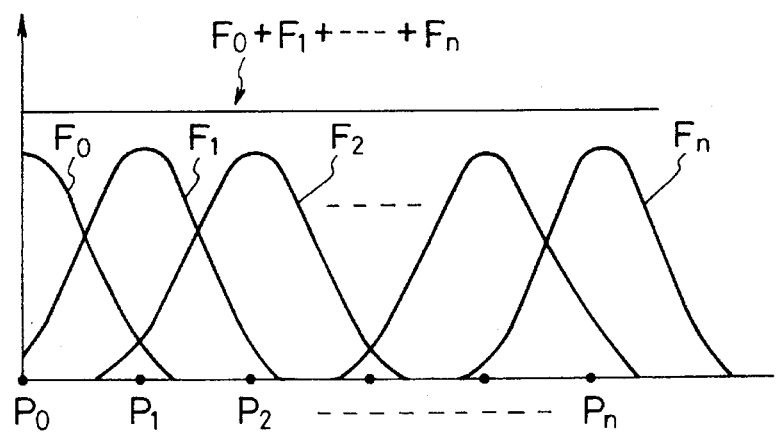
Figure 16C:
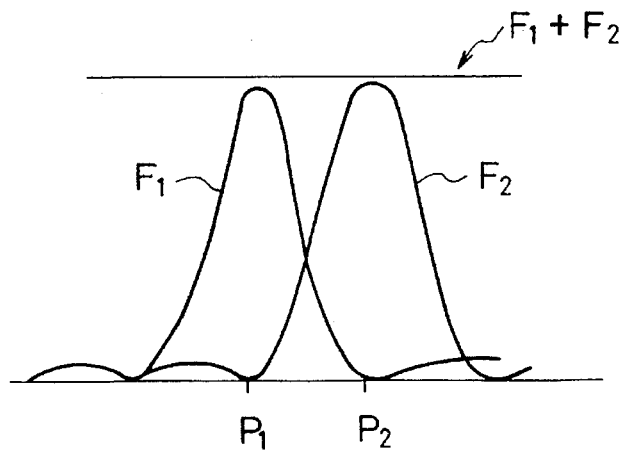

On the other hand, an intensity distribution function F by the diffraction is expressed as follows as shown in FIG. 16(A). Therefore, by overlapping intensity distribution functions $F_0, F_1, F_2, \ldots, F_n$ due to the diffraction at proper intervals with respect to points $P_0, P_1, P_2, \ldots, P_n$ as shown in FIG. 16B, an almost constant diffraction intensity can be obtained. Namely, this means that a plane can be reconstructed by reproducing a blurred dot image at a proper interval, a plane can be reconstructed. Actually, as shown in FIG. 16C, by overlapping two adjacent dot images $P_1$ and $P_2$ at an interval of π, an almost constant intensity distribution can be obtained. The interval π is equal to the half (x/2) of the extent x of the blur in FIG. 14. By arranging the points on the basis of the blur amount, those points can be seen as if it were a plane having an extent instead of two points for the human eyes in the reproducing mode.

Therefore, since it is sufficient that the half value (x/2) of the extent x of the blur shown in FIG. 14 is set to the half of the interval d between the points $P_1$ and $P_2$ in FIG. 15, $$(½)x=(½)D \tag{6}$$

$$\lambda R/D=(½)R\theta \tag{7}$$

Therefore, the opening width D of the hologram 56 in FIG. 14 is $$D=2\lambda/\theta \tag{8}$$

Figure 17:
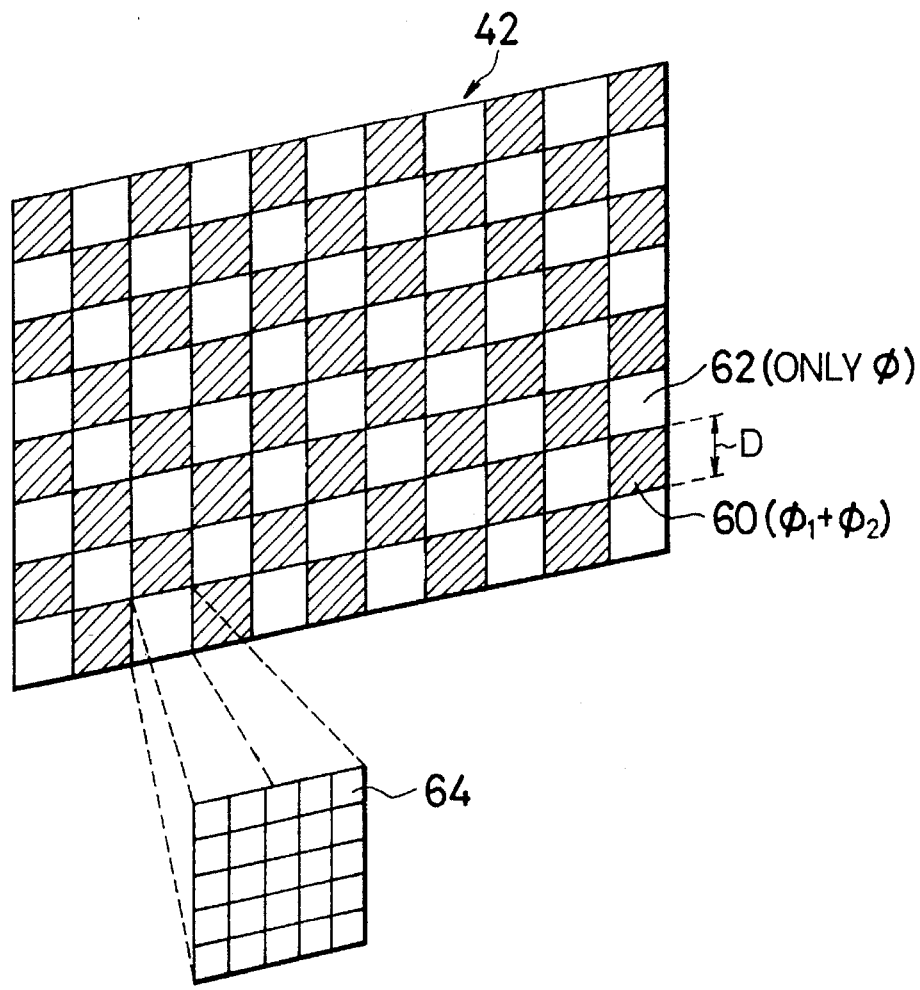
FIG. 17 is an explanatory diagram showing the formation of a discrete phase distribution to make a reconstructed image blur at a point set in a non-feature portion of the invention.

Specifically speaking, when an image is reconstructed by the wavelength λ=633 nm of the reproduction light and the angle θ=(1/30)°, the opening width D of the hologram 56 is equal to (D=2.18 mm). Thus, with respect to the non-feature portion, it is sufficient to display the phase distribution by a hologram having an opening of D=2.18 mm. Namely, as shown in FIG. 17, with regard to the sampling points set in the non-feature portion, there is no need to execute the phase calculations over the whole surfaces of the hologram display surface 42. In case of dividing by the opening width D=2.18 mm, it is sufficient to perform the phase calculations with respect to a checkwise hatched region 60. For such discrete phase calculations at the hologram display surface 42 based on such sampling points of the non-feature portion, with respect to the feature portion, it is necessary to calculate the phase with respect to the whole surface of the hologram display surface 42. That is, now assuming that a phase distribution calculated with regard to the feature portion is set to φ1 and a phase distribution calculated with respect to the non-feature portion is set to φ2, since a phase distribution regarding the feature portion is obtained with respect to a blank region 62 in FIG. 17, it is calculated so as to display only the phase distribution φ1. With respect to the hatched portion, phase distributions are calculated so as to display the result of the addition (φ₁+φ₂) of the phase distributions of the feature portion and non-feature portion. Each of the regions 60 and 62 in FIG. 17 is further divided into microregions 64. One of the microregions 64 is enlargedly shown in FIG. 17 as an example. Therefore, in the actual phase distribution calculation, the phase distribution is calculated every microregion 64 as a minimum unit. The microregion 64 as a minimum unit is determined by a pixel density of the display device to display the calculated phase distribution.

Figure 18A:
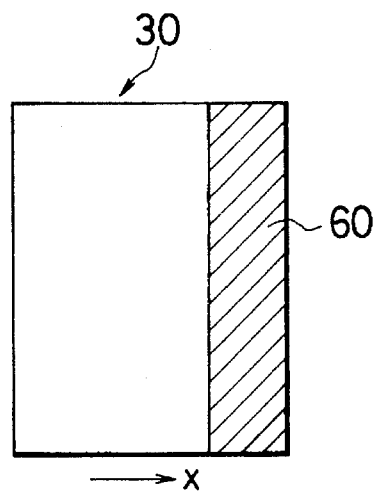
FIGS. 18A and 18B are explanatory diagrams of a method of eliminating a dark portion as sampling points.
Figure 18B:
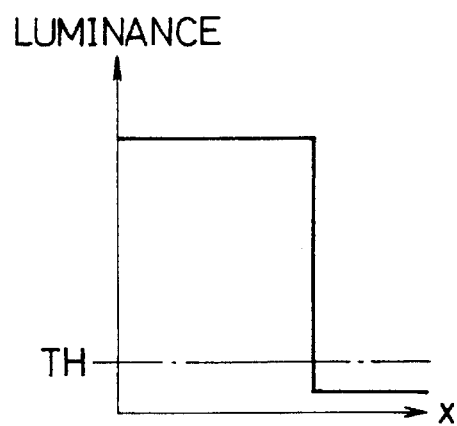

Further, with respect to the setting of the sampling points of the non-feature portion in the invention, a process to eliminate the sampling points from the calculation target with regard to the dark portion. For example, it is now assumed that a part 60 of the display target 30 shown in FIG. 18A is slightly darker than the other portion. As shown in FIG. 18B, a luminance distribution in this case is such that as shown in FIG. 18B, a change in luminance ratio of the portion on the right side having a low luminance is larger than that of the portion on the left side having a high luminance and that the luminance of the low luminance portion is equal to or less than a threshold value TH. No sampling point is set for such a dark portion 60. Therefore, the number of sampling points when the dark portion exists is small and the amount of calculations for the phase distributions can be reduced.

The calculation of the phase distributions based on the 3-dimensional luminance data shown by the sampling points in the feature portion and non-feature portion will now be described. First, the principle of a hologram will be explained. A hologram is obtained as follows. One laser beam is divided into two beams. One of them is irradiated to an object, so that a laser beam (object light) which is scattered by the object is derived. A hologram is obtained by an interference of two light fluxes of the laser beam (object light) and another laser beam (reference light). Now, assuming that a wave front of the reference light is set to R•exp(jφ_r) and a wave front of the object light is set to O•exp(jφ_o). An exposing intensity $I_H$ of the hologram is obtained by the following equation (9).

$$I_H=R^2+O^2+2\cdot R\cdot\cos(\phi_o-\phi_r) \tag{9}$$

In case of developing the hologram, changes in amplitude and phase are proportional to the exposing intensity $I_H$ of the equation (9). To electrically form a hologram, a space light modulating device such as a liquid crystal device or the like which can change an amplitude or a phase of the light can be used. By inputting the same wave front as that of the reference light to the hologram formed as mentioned above, a hologram can be reproduced. In the exposing intensity $I_H$ of the equation (9), since only the third term of the right side contributes to the reconstruction of the object light, consideration will now be made with regard to the third term of the right side. A transmission light T from the hologram is $$\begin{aligned}T &= I_H \times R \times \exp(j\phi_r) \\ &\propto 2 \times R \times O \times \cos(\phi_o - \phi_r) \times \exp(j\phi_r) \\ &= O \times \exp(j\phi_r) + O \times \exp\{-j(\phi_o - 2 \times \phi_r)\}\end{aligned} \tag{10}$$

The first term of the right side of the equation (10) denotes that the wave front was reproduced from the object and the second term of the right side indicates a conjugate wave of the object light. From the above description of the principle, in order to obtain the phase distribution of the hologram, it is sufficient to calculate only the third term of the right side of the equation (9).

Figure 19:
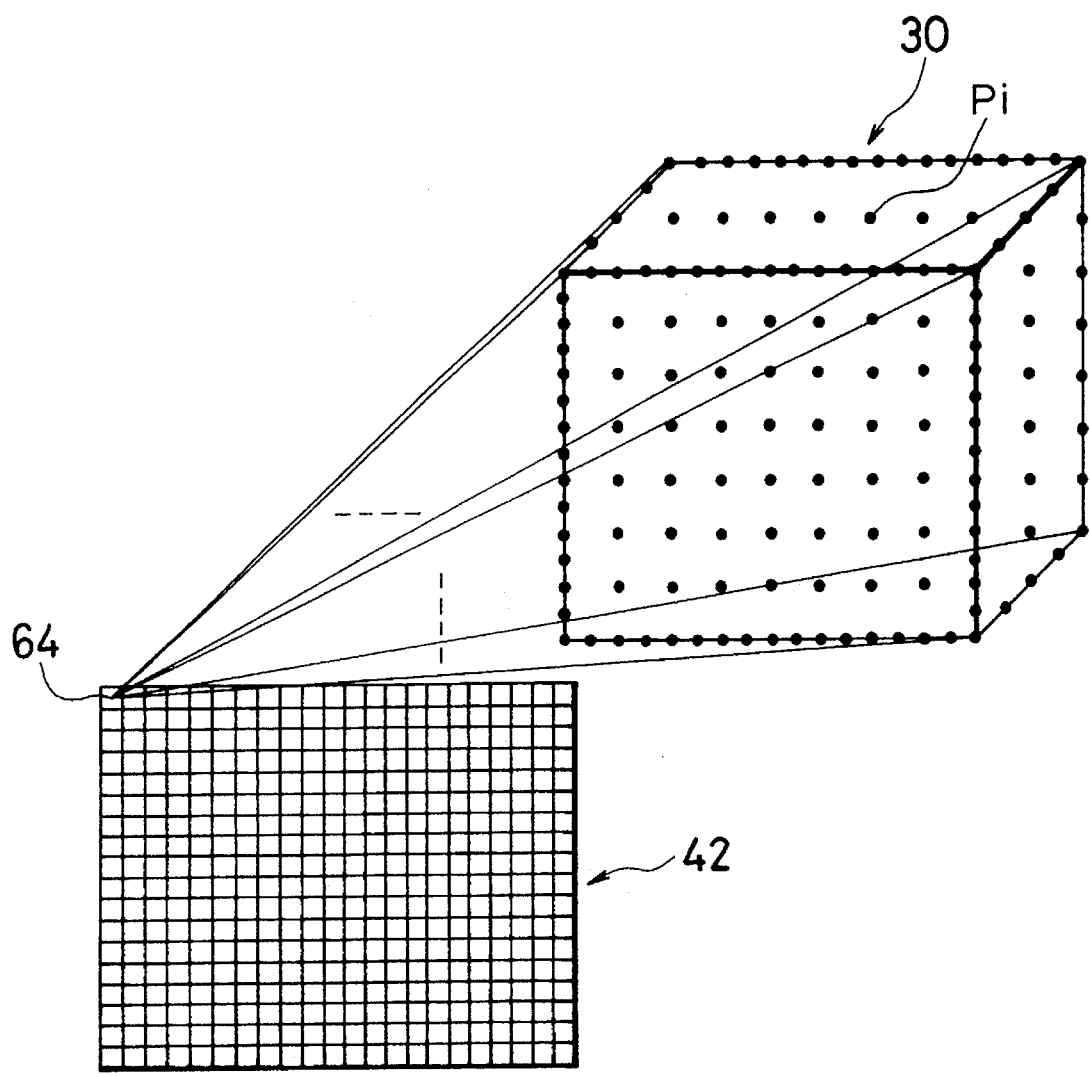
FIG. 19 is an explanatory diagram of the phase distribution calculation according to the invention.

FIG. 19 shows the principle of the calculation of the phase distribution according to the invention. Now, when the reference light is regarded as a plane wave, since an intensity of the plane wave doesn't change in dependence on the location, a light intensity R can be ignored and a phase $\phi_r$ can be set to 0. Now, assuming that a luminance (scattering degree) of a certain sampling point $P_i$ having the coordinates $(X_i, Y_i, Z_i)$ of the display target 30 is set to $I_i$, the exposing intensity $I_H$ of the microregion 64 as a minimum unit on the hologram display surface 42 is $$I_H = \sum_i \{(I_i/r) \times \cos(k \times r)\} \tag{11}$$

where, k indicates the number of waves of the laser beam.

$$r=\sqrt{\{(X_i-X_{hi})^2+(Y_i-Y_{hi})^2+Z_i^2\}} \tag{12}$$

With respect to the sampling points of the non-feature portion, the equations (11) and (12) are calculated every microregion 64 in the hatched region 60 at the hologram display surface 42 shown in FIG. 17. With respect to the sampling points of the feature portion, the equations (11) and (12) are calculated every microregion 64 of the whole hologram display surface 42 and the results of the phase calculations of the non-feature portion of the region 60 are added.

Explanation will now be made with respect to the case where the invention was applied to, for example, a holographic stereogram such that a hologram phase distribution is calculated on the basis of a 2-dimensional image. A holographic stereogram is formed by sequentially allocating phase distributions of 2-dimensional images which are obtained by seeing a target object from a number of different visual points to slit-like hologram regions. Therefore, prior to the phase calculation, by changing the sampling interval of the 2-dimensional image so as to raise a resolution for the feature portion and to reduce a resolution for the non-feature portion, the phase calculation amount can be decreased.

Figure 20A:
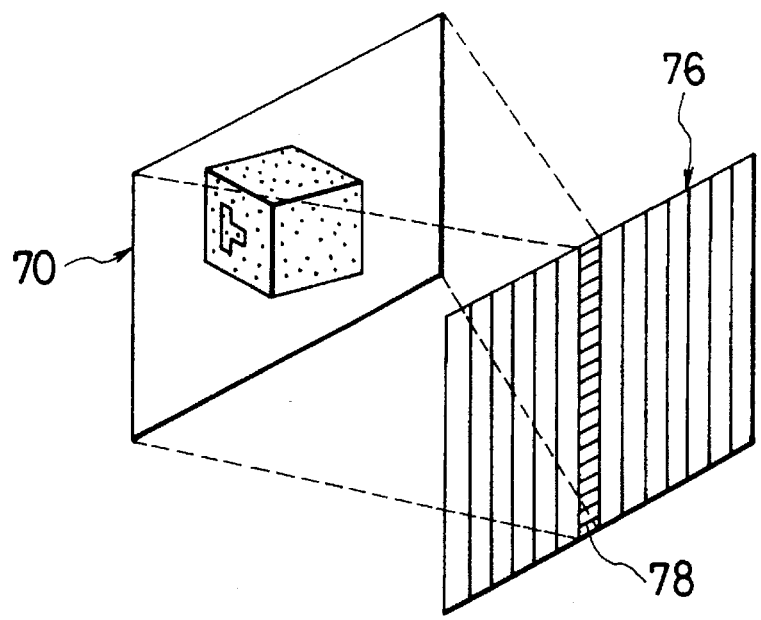
FIGS. 20A and 20B are explanatory diagrams in case of applying the invention to a holographic stereogram to calculate a phase distribution on the basis of a 2-dimensional image.
Figure 20B:
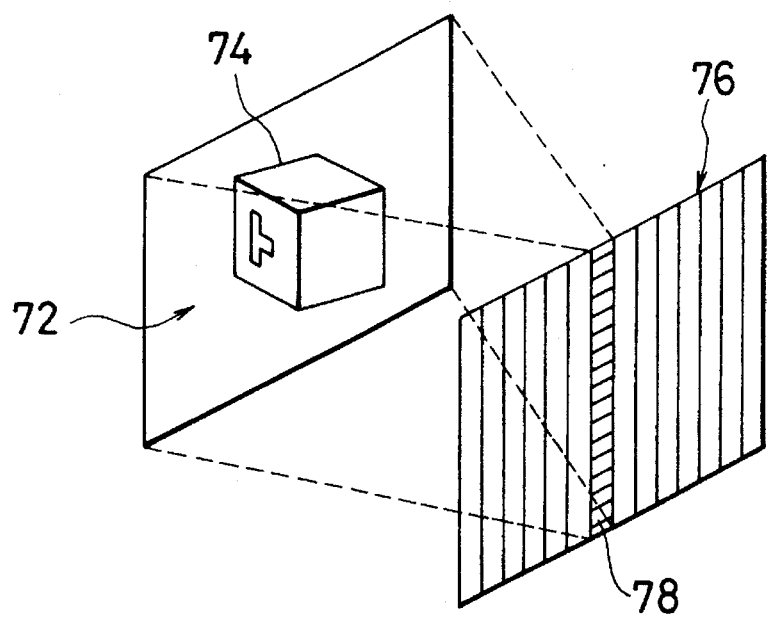

To extract feature points in a 2-dimensional image, the 2-dimensional Laplacian operator shown in FIGS. 8A and 8B is applied to, for example, a 2-dimensional image 70 as shown in FIG. 20A. Subsequently, by executing the overlapping process to the whole image, an image 72 whose feature has been extracted can be obtained as shown in FIG. 20B. With respect to an image 72 after the feature was extracted, for instance, sampling points are finely set with regard to, for example, the edge portion of a 2-dimensional image 74 and a region where a density largely changes. Sampling points are coarsely set with respect to the non-feature portion other than the feature portion. A phase distribution is obtained for every sampling point with respect to a region which is long in the vertical direction on a hologram display surface 76, for example, with regard to a slit region 78 shown as a hatched portion. The sum of the phase distributions is calculated.

On the other hand, in the phase calculation of the holographic stereogram, in the case where target data is 3-dimensional data, a feature is first extracted from the 3-dimensional data and sampling points are set. By subsequently projecting the set sampling points to 2-dimensional planes which are seen from different directions, a 2-dimensional image after completion of the feature extraction to calculate the phase distribution of the stripe region is obtained.

According to the invention as mentioned above, the number of sampling points to perform the phase calculation can be reduced to a value which is almost the half of the conventional method without allowing the observer to substantially feel a deterioration of the picture quality. Therefore, a phase calculation amount in the graphic stereoscopic display can be reduced and a stereoscopic displaying process of a higher speed can be realized.

The present invention is not limited to the above embodiment but many modifications and variations are possible within the scope of the appended claims of the invention. The invention is not limited by the numerical values shown in the embodiment.

What is claimed is:

1. A stereoscopic display method comprising:

a feature portion detecting step of detecting a feature portion in a display target specified by 3-dimensional information;

a sampling point setting step of setting sampling points at a high density into the feature portion detected by said feature portion detecting step and for setting sampling points at a low density into a non-feature portion as a portion other than said feature portion;

a phase calculating step of calculating a hologram phase distribution with respect to the sampling points set in said sampling point setting step;

a phase distribution expressing step of expressing the phase distribution calculated by said phase calculating step; and a wave front converting step of converting the phase distribution expressed by said phase distribution expressing step into a wave front of the light and for displaying a solid image.

2. A method according to claim 1, wherein said sampling point setting step has:

a difference calculating step of calculating a difference of luminance data between two or a plurality of adjacent pixels; and a threshold value processing step of detecting a region, as a feature portion, where the difference value obtained in said difference calculating step is equal to or larger than a predetermined value.

3. A method according to claim 1, wherein said phase calculating step comprises:

a step of setting a region on a hologram to calculate the phase distribution of the sampling points of the feature portion;

a step of setting a region on the hologram to calculate the phase distribution of the sampling points in the non-feature portion so as to be made different from that in the feature portion; and a step of calculating the phase distribution every region.

4. A method according to claim 3, wherein in said phase calculating step, a region in which microregions were discretely arranged onto the hologram is set as a region on a hologram to calculate the phase distribution of the non-feature edge portion sampling points.

5. A method according to claim 1, wherein in said sampling point setting step, a 3-dimensional display target space including a hologram plane to express a phase distribution is divided into a plurality of regions; and setting an interval between sampling points at a different density for every region.

6. A method according to claim 5, wherein said sampling point setting step comprises:

a step of dividing 3-dimensional data of the display target into two groups of data while setting a plane which exists in a region on the side opposite to a solid image observing point for the hologram plane to display the phase distribution and is parallel with the hologram plane and is located at a predetermined distance away from the hologram plane into a boundary surface; and a step of setting the sampling points by a predetermined resolution with respect to a display target which belongs to a region on this side including the solid image observing point with respect to said boundary surface and for setting the sampling points by a resolution that is inversely proportional to the distance with regard to a display target which belongs to a depth region including no solid image observing point with respect to the boundary surface.

7. A method according to claim 1, wherein said sampling point setting step has a step of eliminating a region in which a luminance of the display target is smaller than a predetermined threshold value from a set region of the sampling points.

8. A stereoscopic display method comprising:

a feature portion detecting step of detecting the feature portion in 2-dimensional images which are obtained by seeing a display target specified by 3-dimensional information from a plurality of visual points;

a sampling point setting step of setting sampling points at a high density into the feature portion detected in said feature portion detecting step and setting sampling points of a low density with respect to a non-feature portion as a portion other than the feature portion;

a phase calculating step of calculating hologram phase distributions with respect to the sampling points of the 2-dimensional images set by said sampling point setting step;

a phase distribution expressing step of expressing the phase distribution calculated by said phase calculating step; and a wave front converting step of converting the phase distribution expressed by said phase distribution expressing step into the wave front of the light, thereby displaying a solid image.

9. A method according to claim 8, wherein said sampling point setting step has:

a difference calculating step of calculating a difference of luminance data between two or a plurality of adjacent pixels; and a threshold value processing step of detecting a region in which the difference value obtained in said difference calculating step is equal to or larger than a predetermined threshold value as a feature portion.

10. A method according to claim 8, wherein said phase calculating step comprises:

a step of setting a region on a hologram to calculate a phase distribution of the sampling points of the feature portion;

a step of setting a region on a hologram to calculate a phase distribution of the sampling points of the non-feature portion so as to be different from that of the feature portion; and a step of calculating the phase distribution every said region.

11. A method according to claim 10, wherein in said phase calculating step, a region in which microregions are discretely arranged on the hologram is set as a region on the hologram to calculate the phase distribution of the sampling points of the non-feature portion.

12. A method according to claim 8, wherein said sampling point setting step has a step of eliminating a region in which a luminance of the display target is smaller than a predetermined threshold value from the setting region of the sampling points.

13. A stereoscopic display method comprises:

a feature portion detecting step of detecting a feature portion in a display target specified by 3-dimensional information;

a sampling point setting step of setting sampling points at a high density into the feature portion detected by said feature portion detecting step and setting sampling points at a low density with respect to a non-feature portion as a portion other than the feature portion;

a 2-dimensional image forming step of forming 2-dimensional images by projecting the sampling points of a 3-dimensional image set by said sampling point setting step to a plurality of surfaces;

a phase calculating step of calculating a hologram phase distribution with respect to the projected sampling points of the 2-dimensional images formed by said 2-dimensional image forming step;

a phase distribution expressing step of expressing the phase distribution calculated by the phase distribution expressing step; and a wave front converting step for converting the phase distribution expressed by said phase distribution expressing step into the wave front of the light, thereby displaying a solid image.

14. A method according to claim 13, wherein said sampling point setting step comprises:

a difference calculating step of calculating a difference of luminance data between two or a plurality of adjacent pixels; and a threshold value processing step of detecting a region in which the difference value obtained by said difference calculating step is equal to or larger than a predetermined threshold value as a feature portion.

15. A method according to claim 13, wherein said phase calculating step comprises:

a step of setting a region on a hologram to calculate a phase distribution of the sampling points of the feature portion;

a step of setting a region on a hologram to calculate a phase distribution of the sampling points of a non-feature portion so as to be different from the feature portion; and a step of calculating a phase distribution every region.

16. A method according to claim 15, wherein in said phase calculating step, a region in which microregions are discretely arranged on the hologram is set as a region on the hologram to calculate the phase distribution of the sampling points of the non-feature portion.

17. A method according to claim 13, wherein in said sampling point setting step, a 3-dimensional display target space including a hologram plane to display the phase distribution is divided into a plurality of regions, and an interval between the sampling points is set at a density which is different every region.

18. A method according to claim 17, wherein said sampling point setting step comprises:

a step of dividing 3-dimensional data of the display target into two groups of data while setting a plane which exists in the region on the side opposite to a solid image observing point for the hologram plane to display the phase distribution and is parallel with the hologram plane and is located at a predetermined distance from the hologram plane into a boundary surface; and a step of setting sampling points by a predetermined resolution with respect to a display target which belongs to a region on this side including the solid image observing point with respect to said boundary surface and setting sampling points by a resolution that is inversely proportional to the distance with respect to a display target which belongs to a depth region including no solid image observing point with respect to said boundary surface.

19. A method according to claim 13, wherein said sampling point setting step has a step of eliminating a region in which a luminance of the display target is equal to or smaller than a predetermined threshold value from the set region of the sampling point.

20. A stereoscopic display apparatus comprising:

feature portion detecting means for detecting a feature portion in a display target specified by 3-dimensional information;

sampling point setting means for setting sampling points at a high density into the feature portion detected by said feature portion detecting means and for setting sampling points at a low density with respect to a non-feature portion as a portion other than said feature portion;

phase calculating means for calculating a hologram phase distribution with respect to the sampling points set by said sampling point setting means;

phase distribution expressing means for expressing the phase distribution calculated by said phase calculating means; and wave front converting means for converting the phase distribution expressed by said phase distribution expressing means into the wave front of the light, thereby displaying a solid image.

21. A stereoscopic display apparatus comprising:

feature portion detecting means for detecting a feature portion in 2-dimensional images which are obtained by seeing a display target specified by 3-dimensional information from a plurality of visual points;

sampling point setting means for setting sampling points at a high density into the feature portion detected by said feature portion detecting means and for setting sampling points at a low density with respect to a non-feature portion as a portion other than the feature portion;

phase calculating means for calculating a hologram phase distribution with respect to the sampling points of the 2-dimensional images set by said sampling point setting means;

phase distribution expressing means for expressing the phase distribution calculated by said phase calculating means; and wave front converting means for converting the phase distribution expressed by said phase distribution expressing means into the wave front of the light, thereby displaying a solid image.

22. A stereoscopic display apparatus comprising:

feature portion detecting means for detecting a feature portion in a display target specified by 3-dimensional information;

sampling point setting means for setting sampling points at a high density into the feature portion detected by said feature portion detecting means and for setting sampling points at a low density with respect to a non-feature portion as a portion other than said feature portion;

2-dimensional image forming means for projecting the sampling points of the 3-dimensional image set by said sampling point setting means onto a plurality of surfaces, thereby forming 2-dimensional images;

phase calculating means for calculating a hologram phase distribution with respect to the projected sampling points of the 2-dimensional image formed by said 2-dimensional image forming means;

phase distribution expressing means for expressing the phase distribution calculated by said phase calculating means; and wave front converting means for converting the phase distribution expressed by said phase distribution expressing means into the wave front of the light, thereby displaying a solid image.

* * * * *

UNITED STATES PATENT AND TRADEMARK OFFICE
CERTIFICATE OF CORRECTION

PATENT NO. : 5,483,364
DATED : January 9, 1996
INVENTOR(S) : Manabu ISHIMOTO, et al.

It is certified that error appears in the above-indentified patent and that said Letters Patent is hereby corrected as shown below:

Column 1, line 53, delete first occurrence "," and change "calculation" to --calculations--.

Column 5, line 23, after "In" please delete "the".

Column 8, line 44, change "8" to --$\theta$--.

Column 9, line 27, change "$\phi 2$" to --$\phi_2$--.

Signed and Sealed this

Eighteenth Day of June, 1996

Attest:

BRUCE LEHMAN

*Attesting Officer*          *Commissioner of Patents and Trademarks*